(12) United States Patent
Sutter et al.

(10) Patent No.: US 7,027,477 B2
(45) Date of Patent: Apr. 11, 2006

(54) EXPANSION MATCHED THIN DISK LASER AND METHOD FOR COOLING

(75) Inventors: Dirk Sutter, Mountain View, CA (US); James D. Kafka, Palo Alto, CA (US)

(73) Assignee: Spectra Physics Inc., Mountain View, CA (US)

( * ) Notice: Subject to any disclaimer, the term of this patent is extended or adjusted under 35 U.S.C. 154(b) by 524 days.

(21) Appl. No.: 10/232,885

(22) Filed: Aug. 30, 2002

(65) Prior Publication Data
US 2004/0052283 A1  Mar. 18, 2004

(51) Int. Cl.
*H01S 3/091* (2006.01)

(52) U.S. Cl. ............................. 372/70; 372/34

(58) Field of Classification Search .................. 372/34, 372/36, 71, 70
See application file for complete search history.

(56) References Cited

U.S. PATENT DOCUMENTS

| | | | | |
|---|---|---|---|---|
| 5,173,918 A | * | 12/1992 | Townsend et al. | 372/95 |
| 5,200,947 A | | 4/1993 | Satake et al. | 369/275 |
| 5,553,088 A | * | 9/1996 | Brauch et al. | 372/34 |
| 5,790,574 A | | 8/1998 | Rieger et al. | 372/13 |
| 5,999,544 A | | 12/1999 | Petersen | 372/6 |
| 5,999,554 A | | 12/1999 | Marshall | 372/71 |
| 6,304,584 B1 | | 10/2001 | Krupke et al. | 372/22 |
| 6,347,109 B1 | * | 2/2002 | Beach et al. | 372/75 |
| 6,847,673 B1 | * | 1/2005 | Dane et al. | 372/75 |
| 2001/0055422 A1 | | 12/2001 | Roustaei | 382/181 |
| 2003/0161376 A1 | | 8/2003 | Zapata | 372/70 |

OTHER PUBLICATIONS

Brunner et al., "240-fs pulses with 22-W average power from a mode-locked thin-disk Yb:KY(WO$_4$)$_2$ laser", Optics Letters, vol. 27, No. 13, pp. 1162-1164, Jul. 1, 2002.

Leplan et al., "Residual stresses in evaporated silicon dioxide thin films: Correlation with deposition parameters and aging behavior", J. Appl. Phys. 78 (2), pp. 962-968, Jul. 15, 1995.

Pujol et al., "Structure, crystal growth and physical anisotropy of KYb(WO$_4$)$_2$, a new laser matrix", J. Appl. Cryst. 35, pp. 108-112, (2002).

* cited by examiner

*Primary Examiner*—Min Harvey
*Assistant Examiner*—Dung T. Nguyen
(74) *Attorney, Agent, or Firm*—Heller Ehrman LLP; Paul Davis

(57) ABSTRACT

An optical system includes a diode pump source and a thin disk gain media. The thin disk gain media has first and second surfaces and is made of a material with an anisotropic thermal expansion. At least one of the first and second surfaces is a cooling surface. The thin disk gain media is cut at an angle to provide substantially the same thermal expansion coefficient in all directions lying in a plane that is parallel to the cooling surface. An optical coupler is positioned between the diode pump source and the thin disk gain media to direct an output from the diode pump source to the thin disk gain media.

24 Claims, 3 Drawing Sheets

EXPANSION MATCHED THIN DISK LASER AND METHOD FOR COOLING

BACKGROUND OF THE INVENTION

1. Field of the Invention

This invention relates to a thin disk gain medium for a laser and more particularly to a thin disk gain medium with an anisotropic thermal expansion.

2. Description of Related Art

Different thermal expansion coefficients impose a severe problem for bonded structures as the mechanical stress that is induced through unequal expansion/contraction during thermal changes can break the bond. For thin materials non-uniform expansion can also induce fracture during coating processes that tend to heat the substrate. In this context "bonding" therefore includes coating the first material with a second material or multiple layers, e.g. depositing a dielectric coating on a thin laser crystal. It also includes soldering a thin laser crystal to a heat sink using a third material like indium during which process the structure is heated above the melting point of said third material and cooled to form a solid bond. Thermal fracture imposes a particular problem for double-tungstate laser materials such as Yb:KYW, Yb:KGW, KYbW, Nd:KGW, Nd:KYW, when these materials are to be used in a thin disk geometry. The thermal expansion coefficient of these materials is known to be highly anisotropic.

Of the double-tungstates, the ytterbium-doped crystals hold particular promise for diode pumped solid-state lasers, both for the generation of high-power laser radiation and the generation of ultrafast pulses [Brunner et al., Optics Letters, Volume 27, Issue 13, 1162–1164, July 2002].

Yb:KYW thin disk lasers have used disks that were pressure bonded to copper heat sinks using relatively thick indium foil as a third material that liquefies under pressure. This bonding method has previously been used also for bonding Yb:YAG disks to copper heat sinks, and the relatively soft, thick indium layer can compensate for some of the thermal expansion mismatch between YAG and copper that would otherwise cause problems when heat is deposited in the disk via laser radiation.

The drawback of using such a thick indium layer is that the thermal conductivity is low, such that the temperature of the disk will always be significantly higher than that of the (cooled) heat sink, compromising the efficiency of quasi-three-level laser materials and possibly leading to thermal lensing, excessive deformation, and ultimately stress induced fracture. Solutions to solder Yb:YAG with a much thinner layer of indium using a temperature on the order of 160° C. have required the replacement of copper with a copper-tungsten alloy that is expansion matched to Yb:YAG. This method has previously failed for double-tungstates because of their large anisotropy of thermal expansion.

Previous attempts to use such materials in thin disk lasers were limited by the strong expansion mismatch within the plane of the thin disk, which caused thermal fracture either during the coating of the disk, or later during the bonding of the disk, or later during laser operation. According to Pujol et al., J. Appl. Cryst. 35, 108–112 (2002) the diagonalized linear thermal expansion tensor of KYbW has the following expansion coefficients along the principal thermal axes: $2.57 \times 10^{-6}$/K, $8.72 \times 10^{-6}$/K, and $16.68 \times 10^{-6}$/K.

Different values for the thermal expansions coefficient are given by Aus der Au, (Hartung Gorre, 2001, ISBN 3-89649-636-0), p. 32. In contrast to the above data, the values for Yb:KGW are $4.0 \times 10^{-6}$/K, $3.6 \times 10^{-6}$/K, and $8.5 \times 10^{-6}$/K and are along the crystallographic axes a, b, and c, respectively. Using this data, Brunner et al. teach to use a b-cut crystal for spectroscopic reasons rather than for thermo-mechanical properties: "We chose the laser polarization to be parallel to the a axis of the b-cut Yb:KYW crystal to utilize the largest emission cross section." Note that according to these published values, the thermal expansion along one of the two axes in the bonding plane is at least 2.25 times larger than the other.

There is a need for an improved optical system, and its methods of use, that has a thin disk gain media. There is a further need for an optical system, and its methods of use, that has a thin disk gain media with an essentially constant thermal expansion coefficient in all directions in a plane of a cooling surface of the thin disk gain media.

SUMMARY OF THE INVENTION

An object of the invention is to provide an optical system, and its methods of use, that has a thin disk gain media made of a material with an anisotropic thermal expansion, cut to provide an essentially constant thermal expansion coefficient within plane of the thin disk gain media.

Another object of the present invention is to provide an optical system, and its methods of use, that has a thin disk gain media made of a material with an anisotropic thermal expansion and a heat sink material that has a thermal expansion coefficient that is close to that of the thin disk gain media.

Yet another object of the present invention is to provide an optical system, and its methods of use, that has a thin disk gain media made of a material with an anisotropic thermal expansion and coatings that have substantially the same thermal expansion coefficients.

These and other objects of the present invention are provided in an optical system that includes a diode pump source and a thin disk gain media. The thin disk gain media has first and second surfaces and is made of a material with an anisotropic thermal expansion. At least one of the first and second surfaces is a cooling surface. The thin disk gain media is cut at an angle to provide substantially the same thermal expansion coefficient in all directions lying in a plane that is parallel to the cooling surface. An optical coupler is positioned between the diode pump source and the thin disk gain media to direct an output from the diode pump source to the thin disk gain media.

In another embodiment of the present invention, a method of producing an output beam from an optical device provides an optical system with a diode pump source and a thin disk gain media made of a material with an anisotropic thermal expansion. A cooling surface of the thin disk gain media is cut at an angle to provide substantially a same thermal expansion coefficient in all directions in a plane of the cooling surface.

In another embodiment of the present invention, a method of treating an article provides an optical system with a diode pump source and a thin disk gain media made of a material with an anisotropic thermal expansion. The thin disk gain media is cut at an angle to provide substantially a same thermal expansion coefficient in all directions in a plane of a cooling surface. An output from the laser system is produced and directed to the article.

DETAILED DESCRIPTION OF THE PREFERRED EMBODIMENT

Figure 1:
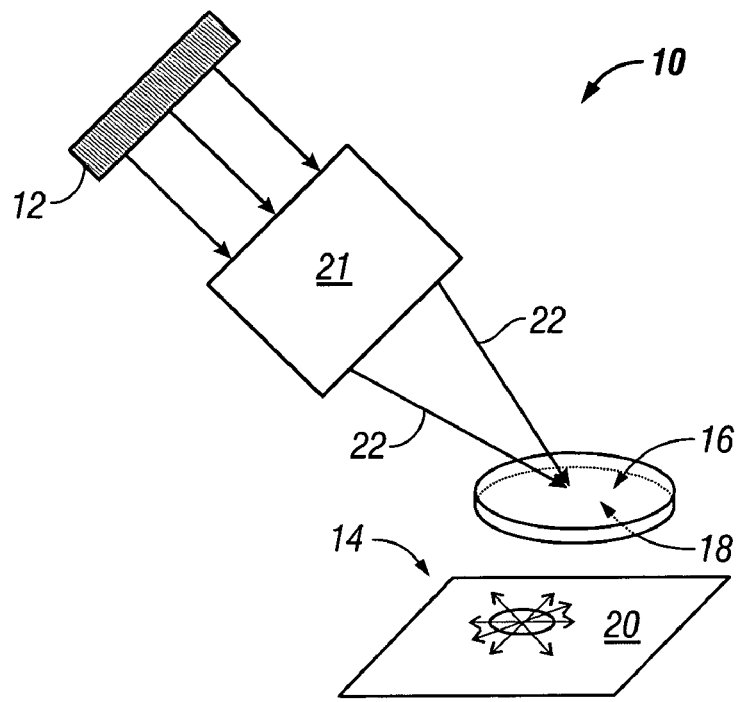
FIG. 1 is a schematic diagram of one embodiment of an optical system of the present invention with a thin disk gain media.
Figure 2:
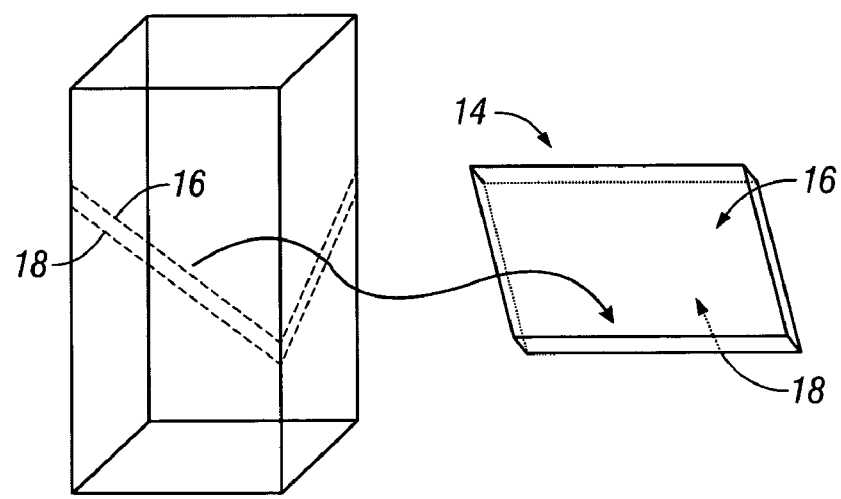
FIG. 2 is illustrates the thin disk gain media of FIG. 1 that is cut at an angle to provide a selected thermal expansion coefficient.

In one embodiment of the present invention, illustrated in FIGS. 1 and 2, an optical system 10 includes a diode pump source 12. Suitable diode pump sources 12 include but are not limited to a fiber-coupled diode, a diode bar, a stack of diode bars, and the like. Laser system 10 can be a laser system, a multi-pass amplifier system, a regenerative amplifier system and the like.

A thin disk gain media 14 has two surfaces 16 and 18. Thin disk gain media 14 can be made of a gain material that has an anisotropic thermal expansion. Thin disk gain media 14 is cut at an angle to provide substantially the same thermal expansion coefficient in all directions lying in a plane 20 that is parallel to surfaces 16 and 18. In one embodiment, surface 16 is an incidence surface, and surface 18 is a cooling surface. In another embodiment, surface 16 is both an incidence and a cooling surface.

An optical coupler 21 is positioned between diode pump source 12 and thin disk gain media 14 to direct an output 22 from diode pump source 12 to thin disk gain media 14. In various embodiments, thin disk gain media is made of, a double-tungstate gain material, a $Yb^{3+}$ doped material, $Yb^{3+}$:KYW, $Yb^{3+}$:KGW, a stoichiometric gain material, KYbW, and the like.

Surface 18 of thin disk gain media 14 can be coated for high reflectance for the laser light emitted by system 10 and surface 16 can be coated with an anti-reflection coating. These coating materials are chosen to provide as low a thermal tension as possible. The low thermal tension reduces the deformation of the thin disk gain media and avoids thermal fracture. Further, the coatings can be optimized for a large range of incidence angles of output 22, including but not limited to 10 degrees to 70 degrees.

Figure 3:
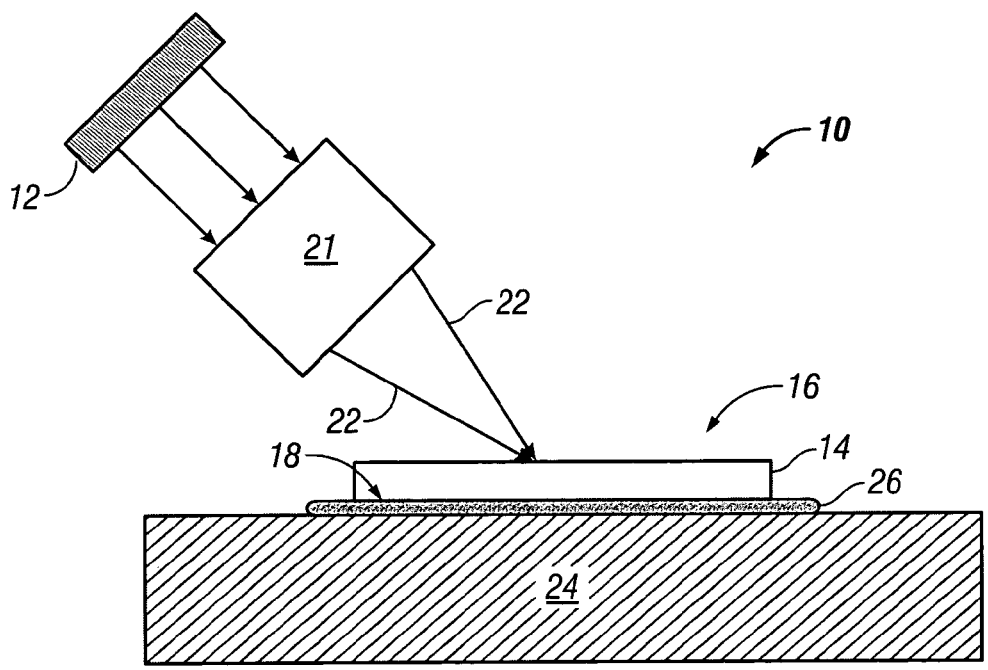
FIG. 3 is a schematic diagram of one embodiment of an optical system of the present invention with a cooling device.
Figure 4:
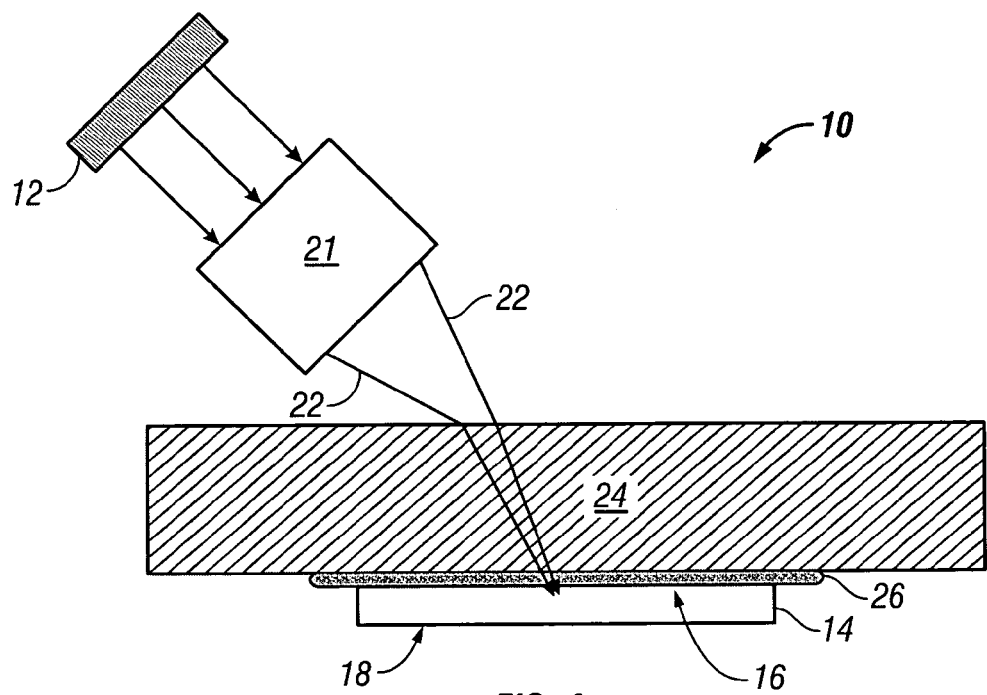
FIG. 4 is a schematic diagram of another embodiment of an optical system of the present invention with a cooling device.

Referring now to FIGS. 3 and 4, system 10 can include at least one cooling device 24 that is coupled to surface 16 or 18. Cooling device 24 has essentially the same thermal expansion coefficient, denoted as "CTE" as the surface 16 and 18. A bonding material 26, including but not limited to a soldering material, couples cooling device 24 to surface 16 or 18 and can have the same thermal expansion coefficient CTE. Further, the high-reflector and the anti-reflection coatings can also have the same thermal expansion coefficient CTE. In FIG. 4, cooling device 24 is transparent for both pump output 22 and the output from system 10. In this embodiment, an anti-reflection coating can be place on the top surface of cooling device 24. Cooling device 24 can also function as a support structure for thin disk gain media 14.

In one embodiment of use, the output of system is directed to an article including but not limited to a metal, a dielectric, a ceramic, a polymer and the like. At the article the output is used for a variety of different applications, including but not limited to, ablation of a surface of the article, drilling a hole in the article, cutting the article and the like.

In various embodiments, system 10 survives larger thermal excursions. This is beneficial for bonding processes, such as soldering or brazing at elevated temperatures using at least a third material as an interface layer that forms a contact if heated above a certain threshold. It is also beneficial for the usage where the possibility to operate the structure over larger temperature spans opens new application possibilities.

For gain media of large thermo-mechanical anisotropy it is essential to determine the full thermal expansion tensor. This information can then be used to calculate the optimum cutting angle of the gain media to provide an essentially constant thermal expansion coefficient within the plane of the thin disk gain media 14, CTE. In the following the method of calculating the correct angle for optimum compensation of anisotropic expansion for the case of KYbW with its dramatic factor of 6.5 between the two extreme principal axes is described. Generally, the thermal expansion of any anisotropic material can be expressed with a thermal expansion tensor, which consists of a symmetric three by three matrix. For KYbW the measured tensor in the crystallophysical system $X_1 \| a$, $X_2 \| b$, $X_3 \| c^*$ according to Pujol et al. is:

$$\alpha_{ij(KYbW)} = \begin{pmatrix} 10.50 & 0 & -3.31 \\ 0 & 2.57 & 0 \\ -3.31 & 0 & 14.90 \end{pmatrix} \times 10^{-6} K^{-1}.$$

Figure 5:
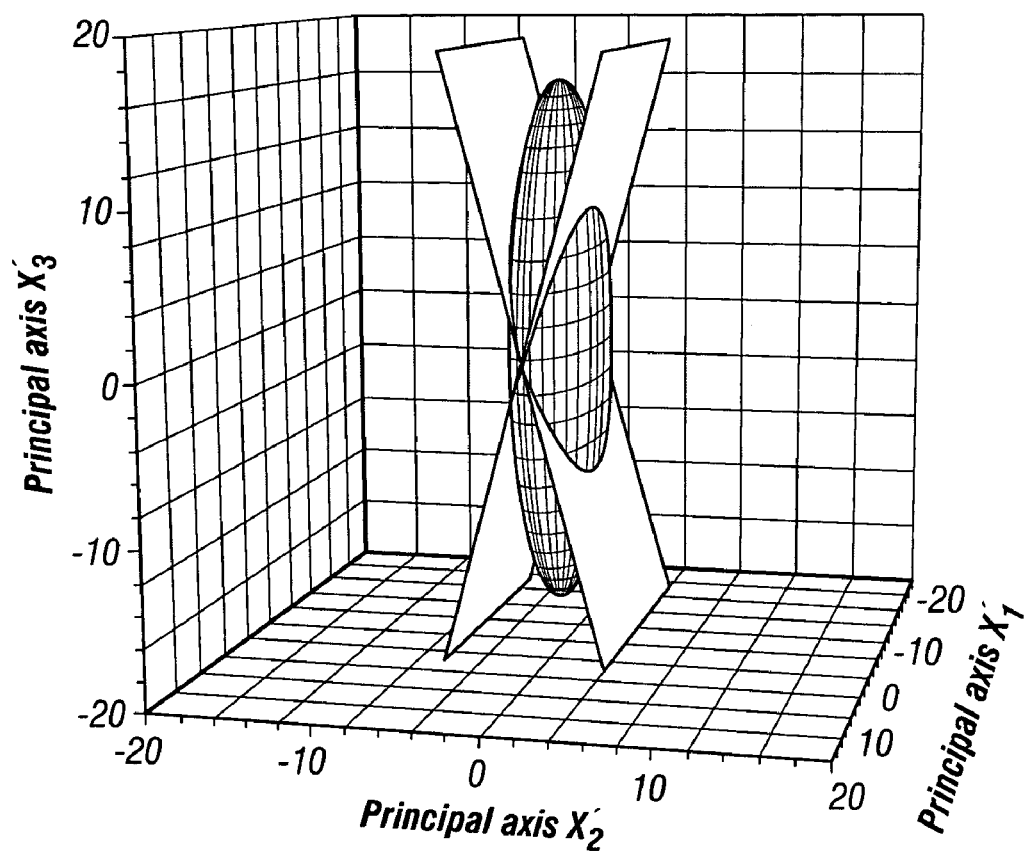
FIG. 5 is a diagram of an ellipsoid of relative thermal expansion of KYbW in the principal system $X_1'$, $X_2'$, and $X_3'$ showing the two planes of optimum cut to equalize thermal expansion, where the intersection of those two planes with the ellipsoid is circular.

From this tensor the principal axes are found by standard linear algebra, solving for the Eigenvalues and Eigenvectors of the matrix. In this simple case, the b axis is a principal axis, and the other two Eigenvalues are found by solving the following equation:

$$\det\left[\begin{pmatrix} 10.50 & -3.31 \\ -3.31 & 14.90 \end{pmatrix} \times 10^{-6} K^{-1} - \begin{pmatrix} 1 & 0 \\ 0 & 1 \end{pmatrix} \times \lambda \right] = 0$$

or:

$$\lambda^2 - 25.4 \times 10^{-6} K^{-1} \lambda + 145.4939 \times 10^{-12} K^{-2} = 0$$

from which the two Eigenvalues:

$\lambda_1 = 8.72 \times 10^{-6}$ $K^{-1}$ and $\lambda_2 = 16.68 \times 10^{-6}$ $K^{-1}$ follow. This result implies that the thermally induced deformation of a spherical object will be elliptical, with principal axes $X_1'$, $X_2'$, and $X_3'$. The thermal expansion ellipsoid is shown in FIG. 5 with respect to these principal axes. For a temperature rise of 200° C., e.g., a principal axis of strongest expansion will stretch by 0.33% whereas the effect is 6.5 times lower for the axis of smallest expansion. It is well known that an ellipsoid can be cut by a plane such that the intersection will have a circular shape, as shown in FIG. 5. According to embodiments of the present the following simple pair of equations is solved, relating the principal half axes of maximum and minimum expansion with the one of intermediate expansion, labeling a=8.72, b=2.57, and c=16.68:

$$\left(\frac{x_2}{b}\right)^2 + \left(\frac{x_3}{c}\right)^2 = 1$$

and $$x_2^2 + x_3^2 = a^2,$$

which yields the following solution for $x_2$ and $x_3$:

$$x_3 = \pm c\sqrt{\frac{a^2-b^2}{c^2-b^2}} = \pm 8.43 \text{ and } x_2 = \pm\sqrt{a^2 - x_3^2} = \pm 2.22.$$

By inserting this solution into the original equation it is verified that the point $(0, x_2, x_3)$ is on the surface of the ellipsoid and that its distance from the origin is:

$$r = \sqrt{x_2^2 + x_3^2} = a.$$

Therefore by cutting gain media 14 such that the cut can be characterized by the ratio of $x_2/x_3 = 0.263$, there is essentially equal thermal expansion within the plane of thin disk gain media 14 with a value of $8.72 \times 10^{-6}/K$.

The material selected for cooling device 24 has a thermal expansion coefficient that is close to that of thin disk gain media 14. Some copper tungsten materials such as ELKONITE® 10W53 (75 wt. % W; 25 wt. % Cu) that has a thermal expansion coefficient of $8.6 \times 10^{-6}/K$ at 20° C. to allow for soldering or brazing at fairly high temperatures. Another material of high thermal conductivity that is popular in the semiconductor industry is beryllium oxide, whose expansion coefficient also is about $8 \times 10^{-6}/K$, suggesting that it could be suitable for bonding thin laser disks of similar thermal expansion.

Equally importantly, the isotropic thermal expansion allows for improved dielectric coatings on thin disk gain media 14 cut this way, whereas the traditional b-cut gain media tend to rip apart due to the stress inherent in the deposited dielectric layers. Preferred coating materials according to the current invention are hafnia and alumina with estimated thermal expansion coefficients of about $3.8 \times 10^{-6}/K$ and between 6 and $7 \times 10^{-6}/K$, respectively, which are comparatively large with respect to those of silica, which is estimated to be between 0.5 and $1.3 \times 10^{-6}/K$. Unfortunately, the refractive index contrast of hafnia and alumina is fairly low, requiring more layers to achieve good reflectance. Tantala and silica have a much larger index contrast and require fewer layers, such that reducing the number of layers can reduce the total stress. The list of possible coating materials is obviously not limited to hafnia, alumina, silica, and tantala, but includes many other possible materials, such as yttria, titania, or magnesium fluoride, just to name a few.

An apodized coating structure can be used that has some layers chosen for their expansion properties and some others chosen for good reflectance. However, measurement of the thermal expansion coefficient of thin films is difficult. Moreover, the values depend also on the deposition technique, with denser coatings having properties closer to the bulk values, and less dense coatings usually having slightly higher thermal expansion, see "Residual stresses in evaporated silicon dioxide thin films: Correlation with deposition parameters and aging behavior", published in J. Applied Physics 78 (2), 15 Jul. 1995 by American Institute of Physics. In light of the current invention it is clearly desirable to use a deposition technique that minimizes stress in the coatings during deposition as well as operation. Typical deposition temperature ranges are 200–300° C. for evaporative coatings, 50–200° C. for ion assisted deposition, and 70–80° C. plasma-induced heating for ion-beam sputtering.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An optical system, comprising:
    a diode pump source;
    a thin disk gain media with first and second surfaces with at least one of the first and second surfaces being a cooling surface, the thin disk gain media being made of a material with an anisotropic thermal expansion and cut at an angle to provide substantially the same thermal expansion coefficient in all directions lying in a plane that is parallel to the cooling surface; and
    an optical coupler positioned between the diode pump source and the thin disk gain media to direct an output from the diode pump source to the thin disk gain media.

2. The system of claim 1, wherein the thin disk gain media is made of a double-tungstate gain material.

3. The system of claim 1, wherein the thin disk gain media is made of an $Yb^{3+}$ doped material.

4. The system of claim 2, wherein the thin disk gain media is made of $Yb^{3+}$:KYW.

5. The system of claim 2, wherein the thin disk gain media is made of $Yb^{3+}$:KGW.

6. The system of claim 1, wherein the thin disk gain media is made of a stoichiometric gain material.

7. The system of claim 6, wherein the thin disk gain media is made of KYbW.

8. The system of claim 1, wherein the thin disk is coated for high reflectance for laser light emitted by the system on one of the first and second surfaces, and with an anti-reflection coating for the laser light emitted by the system on the other of the first and second surface.

9. The system of claim 8, where the coating material is selected to provide a low thermal tension.

10. The system of claim 8, where the high reflectance coating is selected to provide a high reflectance for pump light over a range of incidence angles from 10 to 70 degrees, and the anti-reflection coating is selected to provide a low reflectance for the pump light over a range of incidence angles from 10 to 70 degrees.

11. The system of claim 1, wherein the thin disk is cooled by at least one cooling device coupled to at least one of the first and second surfaces.

12. The system of claim 11, wherein the cooling device has substantially the same thermal expansion coefficient as the cooling surface of the thin disk.

13. The system of claim 11, further comprising:
    a bonding layer that couples the cooling device to the cooling surface, the bonding layer having substantially the same thermal expansion coefficient as the cooling surface of the thin disk.

14. The system of claim 1, wherein the diode pump source is fiber-coupled.

15. The system of claim 1, wherein the diode pump source is a stack of diode bars.

16. The system of claim 1, wherein the optical system is a laser system.

17. The system of claim 1, wherein the optical system is an amplifier system.

18. A method of producing an output beam from an optical device, comprising:
providing an optical system with a diode pump source and a thin disk gain media made of a material with an anisotropic thermal expansion; and
cutting a cooling surface of the thin disk gain media at an angle to provide substantially a same thermal expansion coefficient in all directions in a plane of the cooling surface.

19. The method of claim 18, further comprising:
coupling a cooling device to the cooling surface.

20. The method of claim 18, further comprising:
coating a surface of the thin disk gain media with a high reflectance coating.

21. The method of claim 18, further comprising:
coating a surface of the thin disk gain media with an anti-reflection coating.

22. A method of treating an article, comprising:
providing an optical system with a diode pump source and a thin disk gain media made of a material with an anisotropic thermal expansion, the thin disk gain media being cut at an angle to provide substantially a same thermal expansion coefficient in all directions in a plane of a cooling surface;
producing an output from the optical system; and
directing the output to the article.

23. The method of claim 22, wherein the article is selected from a metal, a dielectric, a ceramic and a polymer.

24. The method of claim 22, wherein the output is directed to the article to ablate a surface of the article, drill a hole in the article or cut the article.

* * * * *